United States Patent
Copeland et al.

(10) Patent No.: US 8,483,914 B2
(45) Date of Patent: Jul. 9, 2013

(54) ELECTRICALLY ADJUSTABLE CONTROL INTERFACE

(75) Inventors: Bryan Everett Copeland, Bartonville, IL (US); Amory Rodriguez Diccion, Dunlap, IL (US); Jamie Lance McClintock, Washington, IL (US); Patrick Andrew Pryor, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 789 days.

(21) Appl. No.: 12/231,496

(22) Filed: Sep. 3, 2008

(65) Prior Publication Data

US 2010/0057307 A1    Mar. 4, 2010

(51) Int. Cl.
*G06F 7/70* (2006.01)
*G06F 19/00* (2011.01)
*G06G 7/00* (2006.01)
*G06G 7/76* (2006.01)

(52) U.S. Cl.
USPC .......................................................... 701/50

(58) Field of Classification Search
USPC .............. 701/32, 50; 180/326, 329, 331, 334; 108/138; 312/319.5, 319.7–319.8
See application file for complete search history.

(56) References Cited

U.S. PATENT DOCUMENTS

| | | | | |
|---|---|---|---|---|
| 4,307,913 A * | 12/1981 | Spiegelhoff | ............. | 297/411.33 |
| 4,478,308 A * | 10/1984 | Klaassen | ........................ | 180/326 |
| 4,646,869 A * | 3/1987 | Kerner, Jr. | ..................... | 180/334 |
| 4,775,939 A * | 10/1988 | Nakashima et al. | ............. | 701/49 |
| 4,853,687 A * | 8/1989 | Isomura et al. | ................. | 340/5.1 |
| 5,086,869 A * | 2/1992 | Newbery et al. | ............... | 180/329 |
| 5,237,887 A | 8/1993 | Appleberry | | |
| 5,244,066 A | 9/1993 | Mackoway et al. | | |
| 5,261,502 A | 11/1993 | Kronholm, Jr. | | |
| 5,409,079 A * | 4/1995 | Strong et al. | ................... | 180/326 |
| 5,409,080 A * | 4/1995 | Templeton et al. | ........... | 180/326 |
| 5,617,929 A | 4/1997 | Richardson et al. | | |
| 5,666,861 A | 9/1997 | Fee et al. | | |
| 5,924,515 A * | 7/1999 | Stauffer | ......................... | 180/326 |
| 6,164,285 A * | 12/2000 | Garberg et al. | ............... | 180/326 |
| 6,276,749 B1 * | 8/2001 | Okazawa et al. | ......... | 296/190.08 |
| 6,445,960 B1 | 9/2002 | Borta | | |
| 6,594,887 B1 * | 7/2003 | Okuda et al. | ...................... | 29/739 |
| 6,634,453 B2 * | 10/2003 | Arthur et al. | ................... | 180/315 |
| 6,755,275 B2 | 6/2004 | Okanda | | |
| 6,854,401 B2 * | 2/2005 | Lin | .............................. | 108/143 |
| 6,857,498 B2 * | 2/2005 | Vitale et al. | .................... | 180/326 |
| 6,873,233 B2 * | 3/2005 | Sugiyama et al. | ............. | 335/205 |
| 7,121,608 B2 * | 10/2006 | Billger et al. | .............. | 296/65.06 |
| 7,389,845 B2 * | 6/2008 | Longueville et al. | .......... | 180/326 |

(Continued)

FOREIGN PATENT DOCUMENTS

| JP | 63-116563 | 7/1988 |
|---|---|---|
| JP | 10-252100 | 9/1998 |
| JP | 2002-187487 | 7/2002 |

*Primary Examiner* — Khoi Tran
*Assistant Examiner* — Harry Oh
(74) *Attorney, Agent, or Firm* — Finnegan, Henderson, Farabow, Garrett & Dunner LLP

(57) ABSTRACT

An electrically adjustable control interface for a machine comprises a vertical adjustment assembly arranged in vertical support of a control pod module. The vertical adjustment assembly is configured to adjust a vertical position of the control pod module in response to a vertical adjustment command signal generated by a controller. The electrically adjustable control interface also comprises a horizontal adjustment assembly coupled to the control pod module. The horizontal adjustment assembly is configured to adjust a horizontal position of the control pod module in response to a horizontal adjustment command signal generated by the controller.

19 Claims, 8 Drawing Sheets

U.S. PATENT DOCUMENTS

| | | | |
|---|---|---|---|
| 7,520,567 B2 * | 4/2009 | Billger et al. | 297/344.22 |
| 7,748,785 B2 * | 7/2010 | Lucas et al. | 297/411.35 |
| 7,757,806 B2 * | 7/2010 | Bower | 180/326 |
| 2005/0224272 A1 * | 10/2005 | Crawford, Jr. | 180/308 |
| 2006/0042857 A1 * | 3/2006 | Catton et al. | 180/334 |
| 2006/0232116 A1 | 10/2006 | Jang et al. | |
| 2007/0262221 A1 * | 11/2007 | Schroder | 248/278.1 |
| 2008/0248926 A1 * | 10/2008 | Cole et al. | 482/5 |
| 2010/0057307 A1 * | 3/2010 | Copeland et al. | 701/50 |
| 2010/0300796 A1 * | 12/2010 | Ryan et al. | 180/329 |

* cited by examiner

ELECTRICALLY ADJUSTABLE CONTROL INTERFACE

TECHNICAL FIELD

The present disclosure relates generally to control consoles for machines and, more particularly, to an electrically adjustable control interface for machines.

BACKGROUND

Heavy machines, such as tractors, wheel loaders, fork lifts, dozers, excavators, motor graders, and haulers, comprise an operator console that may include, for example, a joystick or directional controller, levers, buttons, interactive touch-screens, and other interface devices configured to receive operational commands from the operator and perform a particular task or function in response to the received commands. Historically, operator consoles were designed to conform to the ergonomic requirements of an operator of "average" size and stature, providing the operator very little flexibility to customize the position or configuration of the console to create a more comfortable operating environment. Accordingly, some modern machines have been provide the operator with some flexibility in adjusting the operator console to make the operating environment more comfortable.

One electrically adjustable operator control console is described in U.S. Pat. No. 6,755,275 ("the '275 patent") to Okanda. The '275 patent describes a positioning structure for an automobile shifter that includes a moving mechanism, which may be electronically adjusted by the operator. Consequently, the positioning structure may be moved forward, backward, up, and down by the operator, based on the desired position of the shifter relative to the operator seat. The positioning structure of the '275 patent may be responsively coupled to the operator seat lift device, such that adjustments to the lift device induce a corresponding adjustment to the positioning structure.

Although the operator control console described in the '275 patent provides a solution for customizing the position of the shifter, it may be insufficient in certain situations. For example, the adjustment mechanism of the system of the '275 patent is installed on an incline, such that horizontal movement of the control console effectuates vertical movement of the control console. Consequently, the operator console described in the '275 patent does not support horizontal movement of the console without a corresponding vertical adjustment. Therefore, operators having desired ergonomic settings that do not correspond precisely with the preset slope configuration of the console may be required to operate the machine outside of their ideal zone of comfort, which may lead to premature operator fatigue, potentially causing a decrease in operator productivity.

SUMMARY

In accordance with one aspect, the present disclosure is directed toward an electrically adjustable control interface for a machine. The electrically adjustable control interface may comprise a vertical adjustment assembly arranged in vertical support of a control pod module and configured to adjust a vertical position of the control pod module in response to a vertical adjustment command signal generated by a controller. The electrically adjustable control interface may also comprise a horizontal adjustment assembly coupled to the control pod module and configured to adjust a horizontal position of the control pod module in response to a horizontal adjustment command signal generated by the controller.

According to another aspect, the present disclosure is directed toward a method for adjusting a control interface for a machine. The method may include generating, by a controller associated with the control interface, a control signal for adjusting a position of a control pod module. A vertical adjustment command signal associated with the control signal may be detected by a vertical adjustment assembly associated with the control interface. A vertical position of the control pod module may be adjusted by the vertical adjustment assembly. The method may also include detecting, by a horizontal adjustment assembly associated with the control interface, a horizontal adjustment command signal associated with the control signal, and adjusting, by the horizontal adjustment assembly, a horizontal position of the control pod module.

In accordance with another aspect, the present disclosure is directed toward an operator console comprising a control pod module and a controller electrically coupled to the control pod module and configured to detect an operator interaction with the control pod module. The controller may be configured to generate a control signal for adjusting a position of the control pod module based on the operator interaction, the control signal including a least one of a vertical adjustment command signal and a horizontal adjustment command signal. The operator console may also include an adjustment module mechanically coupled to the control pod module and electrically coupled to the controller. The adjustment module may include a vertical adjustment assembly arranged in vertical support of the control pod module and configured to adjust a vertical position of the control pod module in response to the vertical adjustment command signal generated by the controller. The adjustment module may further include a horizontal adjustment assembly coupled to the control pod module and configured to adjust a horizontal position of the control pod module in response to the horizontal adjustment command signal generated by the controller.

DETAILED DESCRIPTION

Figure 1:
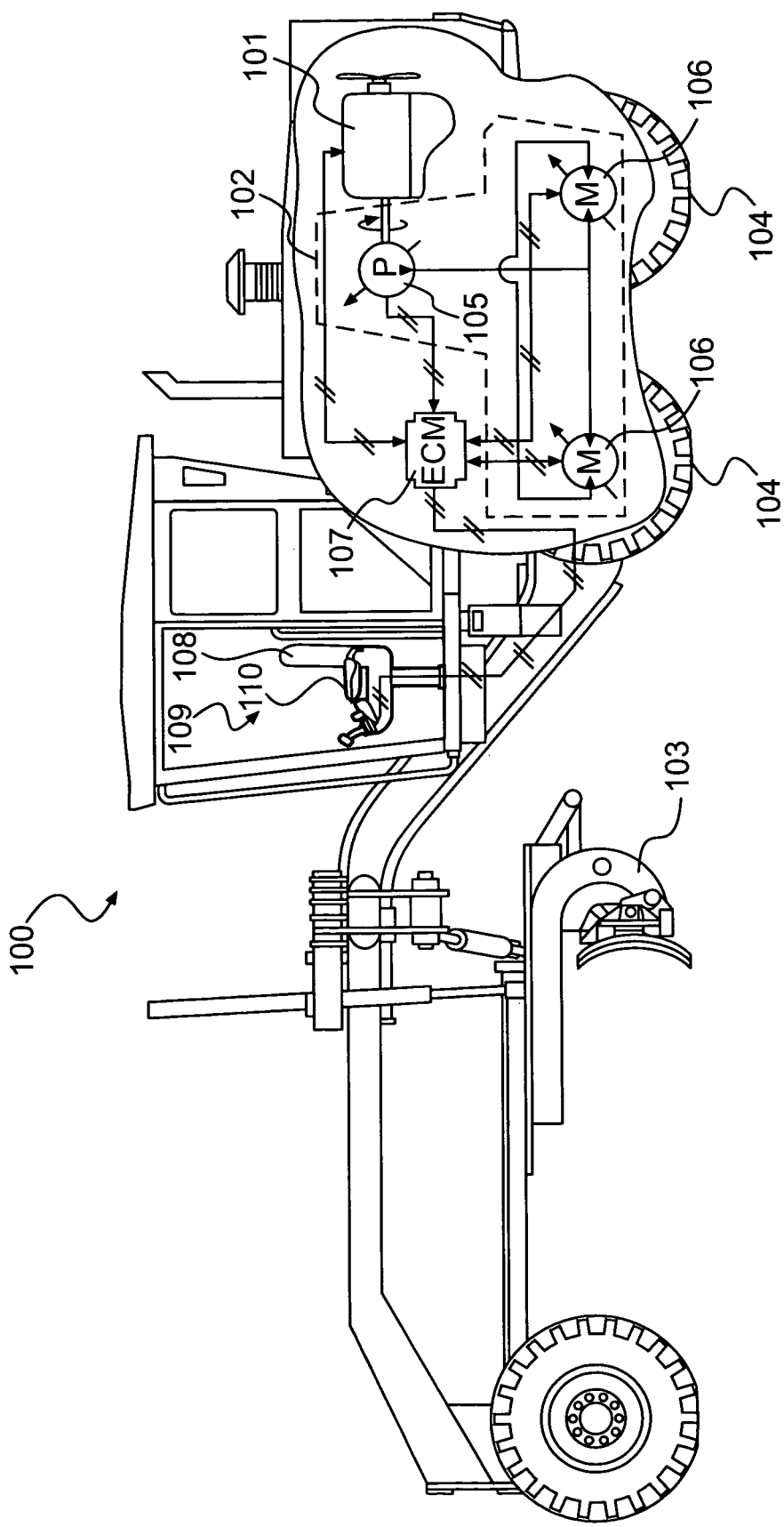
FIG. 1 illustrates an exemplary machine consistent with the disclosed embodiments.

FIG. 1 illustrates an exemplary machine 100 on which an electrically adjustable control interface 110 consistent with certain disclosed embodiments may be implemented. Machine 100 may include or embody any fixed or mobile machine that provides an operator interface such as, for example, a motor grader having an operator cab 109 with an operator console 108 mounted therein, the operating console 108 being configured to receive operator commands. The operator commands may include commands for positioning or maneuvering machine 100, operating an implement or work tool, or otherwise operating or controlling some feature of machine 100. Machine, as the term is used herein, refers to a fixed or mobile machine that performs some type of operation associated with a particular industry. The types of machines listed above are exemplary and not intended to be limiting. Accordingly, although FIG. 1 illustrates machine 100 as a motor grader, machine 100 may be any type of machine associated with a project environment.

Machine 100 includes a plurality of components that cooperate to perform an operation associated with a project environment, based on an operator interaction with a control interface. According to one exemplary embodiment and as illustrated in FIG. 1, machine 100 may include, among other things, a power source 101, a drive system 102 operatively coupled to power source 101, and an electrically adjustable control interface 110 operatively coupled to at least one of power source 101 and drive system 102 and configured to control an operational aspect of the at least one of power source 101 and drive system 102 based on an operator interaction with electrically adjustable control interface 110. The components and features listed above are exemplary only and not intended to be limiting. Accordingly, it is contemplated that machine 100 may include additional, fewer, and/or different components and features than those listed above. Furthermore, although electrically adjustable control interface 110 is described and illustrated as being configured to control certain aspects and features associated with power source 101 and drive system 102, it is contemplated that electrically adjustable control interface 110 may be configured to control additional, fewer, and or different components and/or subsystems associated with machine 100.

Power source 101 may be any suitable device for generating electrical or mechanical power for performing one or more tasks associated with machine 100. For example, power source 101 may include an internal combustion engine such as, for example, a diesel engine, gasoline engine, natural gas engine (or other gaseous fuel-powered engine), or any other engine suitable for generating a mechanical power output.

Drive system 102 may include a plurality of components adapted to propel, maneuver, position, or otherwise move, machine 100. For example, in embodiments where machine 100 embodies a motor grader (as in FIG. 1) drive system 102 may include a hydraulic drive system, whereby energy generated by power source 101 may be harnessed to operate a hydraulic pump 105, which circulates fluid through a hydraulic circuit. The fluid circulated through hydraulic circuit may be used to operate one or more hydraulic motors 106 for rotating one or more traction devices 104 for maneuvering, positioning, driving, or otherwise moving machine 100.

ECM 107 may include a processor-based controller adapted to perform various communication, analytical, and/or control functions associated with machine 100. For example, ECM 107 may be configured to receive data input from a plurality of components and subsystems (e.g., electrically adjustable control interface 110) of machine 100, analyze the received data input, and determine, based on the analysis, an appropriate response to the received data input.

Electrically adjustable control interface 110 may include one or more components configured to receive operator commands and distribute the received commands to ECM 107 for processing. For example, electrically adjustable control interface 110 may include an operator console 108 having one or more interactive devices for receiving operator commands for controlling machine 100. Such interactive devices may include one or more buttons, levers, joysticks, keyboards, displays, touch screen monitors, switches, and/or any other suitable operator interaction device. Electrically adjustable control interface 110 may deliver the received operator commands to ECM 107 for processing, analysis, and/or distribution.

Figure 2A:
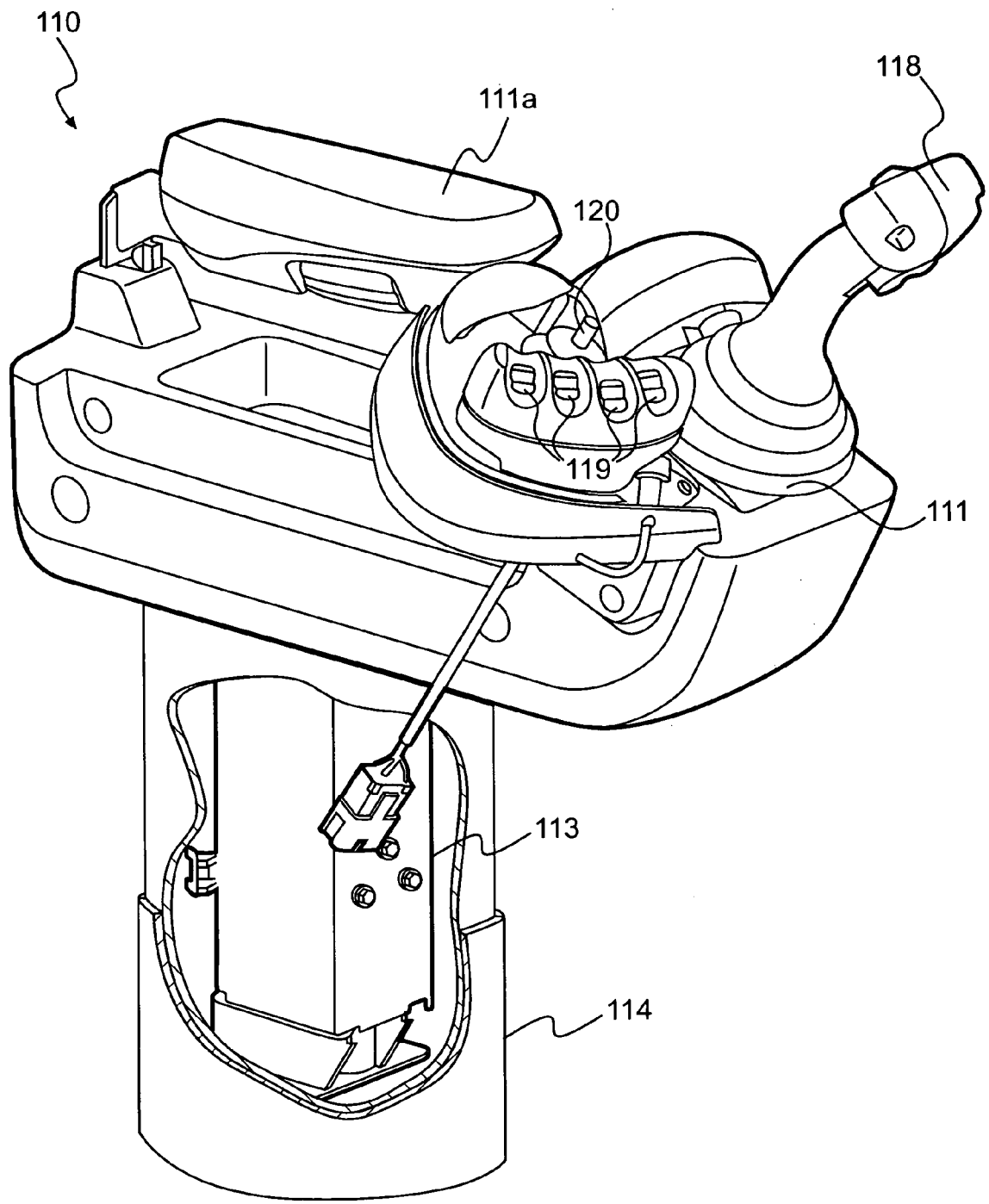
FIG. 2A illustrates a perspective view of an exemplary electrically adjustable control interface, consistent with the disclosed embodiments.
Figure 2B:
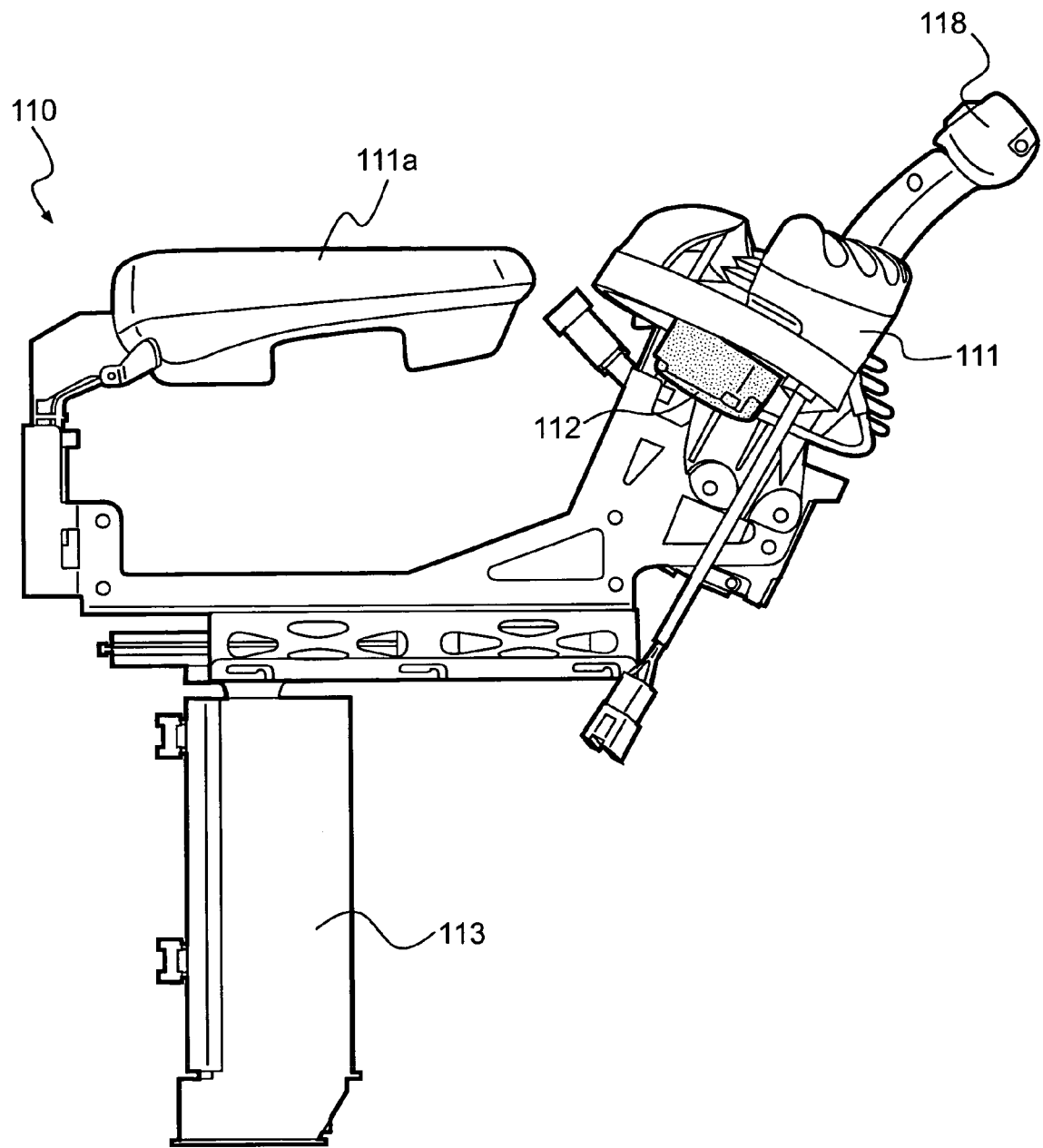
FIG. 2B illustrates a perspective view of the exemplary electrically adjustable control interface of FIG. 2A with the ergonomic covering removed.

FIGS. 2A and 2B each provide a detailed illustration of electrically adjustable control interface 110. Specifically, FIG. 2A provides a diagram illustrating a perspective view of electrically adjustable control interface 110 (including an ergonomic armrest cover assembly and protective telescoping conduit system 114 consistent with certain disclosed embodiments). FIG. 2B provides a diagram illustrating a side view of electrically adjustable control interface 110 (with ergonomic armrest cover assembly removed to illustrate the internal framework structure and internal components associated with electrically adjustable control interface 110). As illustrated in FIGS. 2A and 2B, electrically adjustable control interface 110 includes a control pod module 111, a controller 112 electrically coupled to control pod module 111, an adjustment module 113 operatively coupled to control pod module 111 and electrically coupled to controller 112, and a telescoping, protective conduit 114.

Control pod module 111 may include the portion of electrically adjustable control interface 110 that includes the operator interface devices for receiving operator input, along with ergonomic devices for enhancing operator comfort. For example, control pod module 111 may include various control components including, for example, a joystick 118, one or more control switches 119, and/or an adjustment interface 120 for controlling the operation of adjustment module 113. Furthermore, control pod module 111 may include an armrest assembly 111a for supporting an operator's arm while using control components associated with control pod module 111.

Adjustment module 113 may be coupled to control pod module 111 and configured to adjust the position of control pod module 111 in the vertical (up/down) and horizontal (fore/aft) directions, in response to adjustment commands/inputs received by an operator of machine 100. For example, adjustment module 113 may comprise vertical and horizontal adjustment assemblies, each of which are housed in a telescoping, skeletal, protective, and supportive frame housing. The housing is configured to provide lateral and vertical support of control pod module 111, as well as provide a protective covering for the internal moving components of vertical and horizontal adjustment assemblies. The vertical and horizontal adjustment assemblies are shown in detail in FIGS. 3A and 3B, below.

In accordance with one exemplary embodiment, control pod module 111 and adjustment module 113 may be communicatively and/or electrically coupled via one or more electrical connection assemblies (not shown). For example, control components associate with control pod module 111 may be electrically coupled, via electrical connection assemblies, to vertical and horizontal electric motors associated with adjustment module 113. Electrical connection assemblies may include any suitable component for communicatively coupling control pod module 111 to adjustment module 113 such as, for example, wires, wiring harnesses, wire interconnect devices, etc.

Electrical connection assemblies may be routed in any suitable configuration that supports the requisite connections. According to one embodiment, electrical connection assemblies may be routed within the structural framework of electronically-configurable adjustment assembly 110 and/or adjustment module 113. Alternatively or additionally, electrical connection assemblies may be routed completely external to structural framework or by a combination of internal and external methods. In embodiments where electrical connection assemblies are exposed, a portion of electronically-configurable adjustment assembly 110 and/or adjustment module 113 may be housed within a protective, telescoping conduit 114, configured to protect electrical connection assemblies from damage.

As illustrated in FIG. 2B, controller 112 may be electrically coupled to one or more control components associated with control pod module 111 and may be configured to receive and process signals indicative of an operator interaction with one or more of the control components of control pod module 111. Once the signals have been processed, controller 112 may be configured to generate control signals for controlling one or more aspects of the machine in response to the operator interaction with the control components. For example, controller 112 may receive signals indicative of a movement of joystick 118 by an operator of machine 100. Controller 112 may process the received signals and distribute the received signals to ECM 107, which may subsequently control one or more subsystems to effectuate commands consistent with the operator's movement of joystick 118. Such commands may include, for example, commands for repositioning, maneuvering, or otherwise moving machine 100; operating a work tool, such as implement 103, associated with machine 100; shutting down and starting up of machine 100; or any other suitable commands.

According to an exemplary embodiment, and as an alternative or in addition to controlling subsystems of the machine based on an operator interaction with joystick 118, controller 112 may be configured to adjust certain aspects associated with electrically adjustable control interface 110. For example, many machines associated with a work environment may be shared or operated by different operators. Because different operators have different body types (e.g., different height and weight), the ergonomic requirements for each different body type may be substantially different. Such ergonomic requirements affect operator comfort, particularly during prolonged operating shifts, which may have a dramatic impact on operator productivity. Accordingly, controller 112 may be configured to electronically adjust certain parameters associated with electrically adjustable control interface 110 such as, for example, position (e.g., right/left position, fore/aft position), orientation, height, etc., based on operator interaction with adjustment interface 120.

Controller 112 may receive console adjustment signals from adjustment interface 120, process the console adjustment signals, and provide command signals to adjustment module 113 for adjusting one or more operational aspects associated with electrically adjustable control interface 110 in response to the received console adjustment signals. Command signals may include, for example, vertical adjustment command signals (for adjusting the vertical position of electrically adjustable control interface 110), horizontal adjustment command signals (for adjusting the horizontal (fore/aft) position of electrically adjustable control interface 110), and/or rotational command signals (for adjusting the angle of rotation of electrically adjustable control interface 110).

As an example, controller 112 may receive a console adjustment signal corresponding with an operator command to increase the height of electrically adjustable control interface 110 (i.e., vertically adjust electrically adjustable control interface 110). Controller 112 may receive and process the adjustment signal and generate and distribute a control signal to adjustment module 113, the adjustment module 113 being configured to increase the height of electrically adjustable control interface 110 in response to the control signal. Controller 112 may operate in a similar fashion to decrease the height of electrically adjustable control interface 110, or move the electrically adjustable control interface 110 forward and backward, based on console adjustment signals received from adjustment interface.

Controller 112 may include one or more memory devices (not shown) and may be configured to store settings associated with electrically adjustable control interface 110 in an operator database associated with one or more memory devices. According to one exemplary embodiment, controller 112 may be configured to store settings such as, for example, current vertical and horizontal positions associated with electrically adjustable control interface 110. The settings may be stored in a particular memory location for later retrieval by an operator of machine 100. Controller 112 may include multiple memory locations for storing different groups of settings, each group of settings associated with different operators of machine 100.

Adjustment interface 120 may embody any suitable operator-interactive interface that allows the operator to control the operation of adjustment module 113. According to on exemplary embodiment, adjustment interface 120 may provide control signals indicative of the operator interaction with a portion of adjustment interface 120 to a controller 112 that, in turn, provides the control signals to adjustment module 113 to control the operation of adjustment module 113. According to one exemplary embodiment, adjustment interface 120 may embody a combination switch, which is commonly used to receive operator adjustment commands in automotive power window applications. Alternatively or additionally, adjustment interface 120 may include a mini-joystick controller that provides directional control (for, for example, up/down, fore/aft control), rotational control (for, for example, rotating electrically adjustable control interface 110), and/or pushbutton toggle features (for, for example, storing current position settings in memory for later recall). It should be noted that the specific operations associated with adjustment interface 120 depends on the specific capabilities provided by adjustment module 113, which will be described in greater detail in FIGS. 3A, 3B, 4A, and 4B.

Figure 3A:
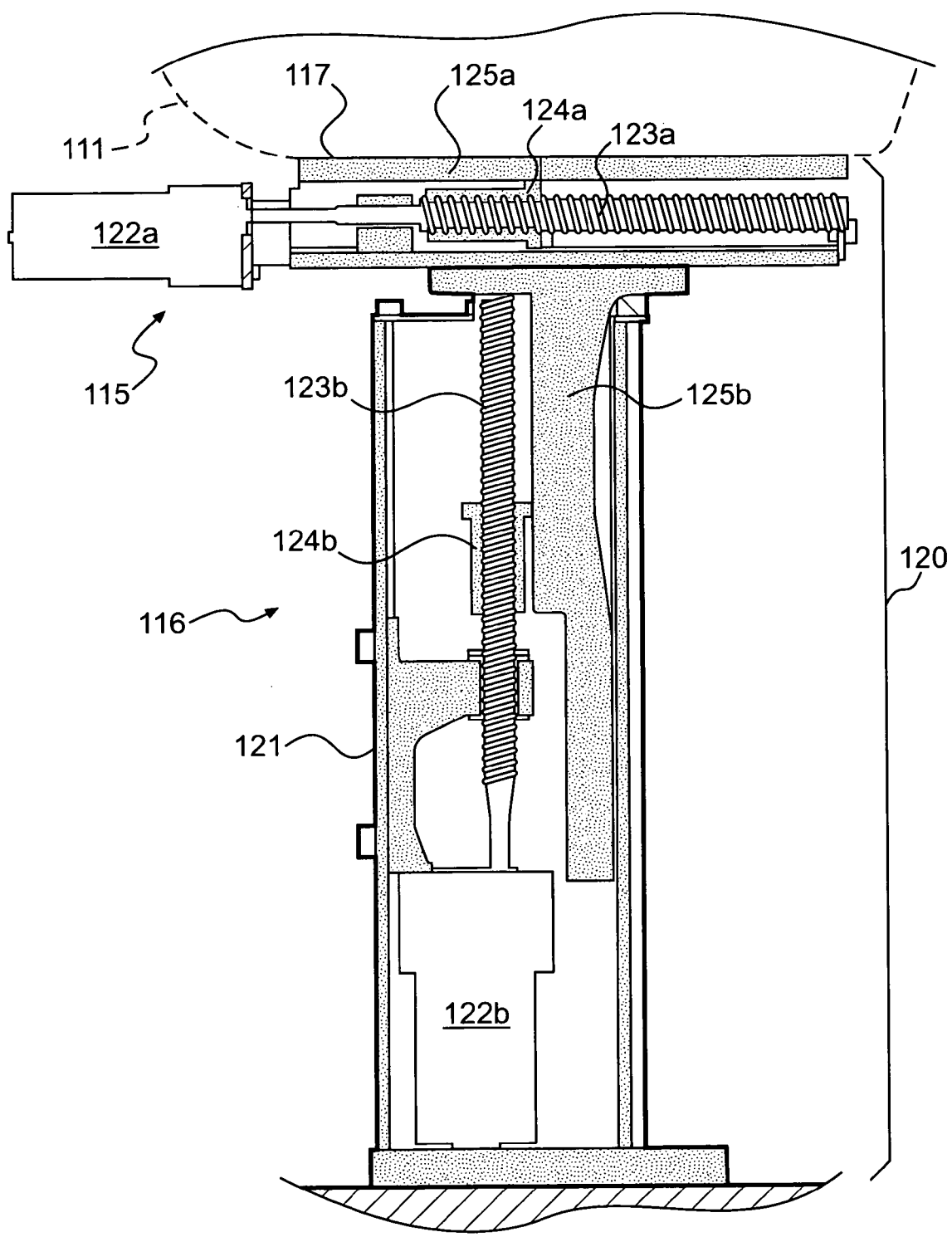
FIG. 3A illustrates a cross-sectional side view of an electrically adjustable control interface depicting adjustment module 113 embodied as a screw-type, worm gear drive system in a fully retracted position, consistent with the disclosed embodiments.
Figure 3B:
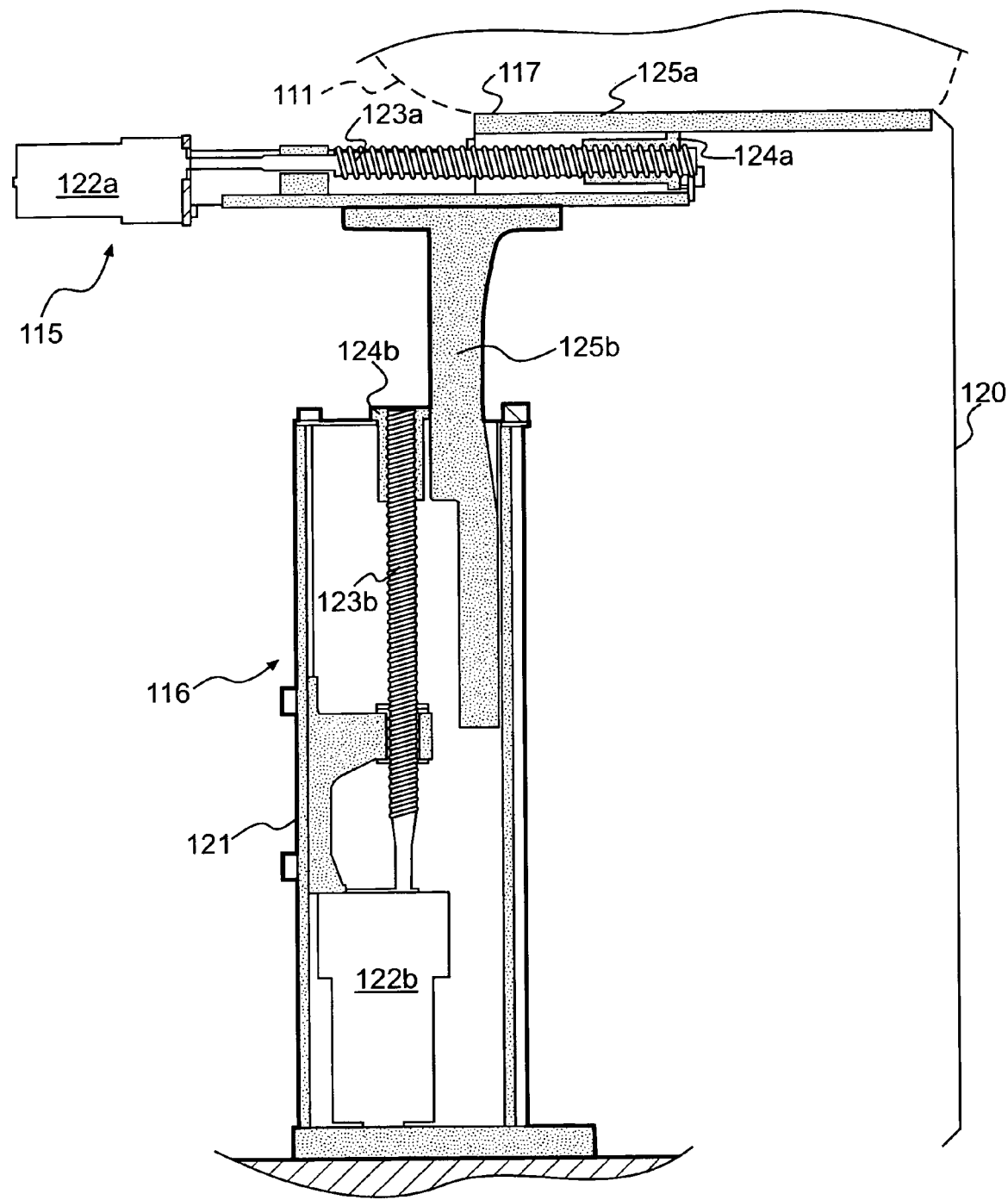
FIG. 3B illustrates a cross-sectional side view of the electrically adjustable control interface depicting adjustment module 113 embodied as a screw-type, worm gear drive system in an extended position, consistent with the disclosed embodiments.
Figure 4A:
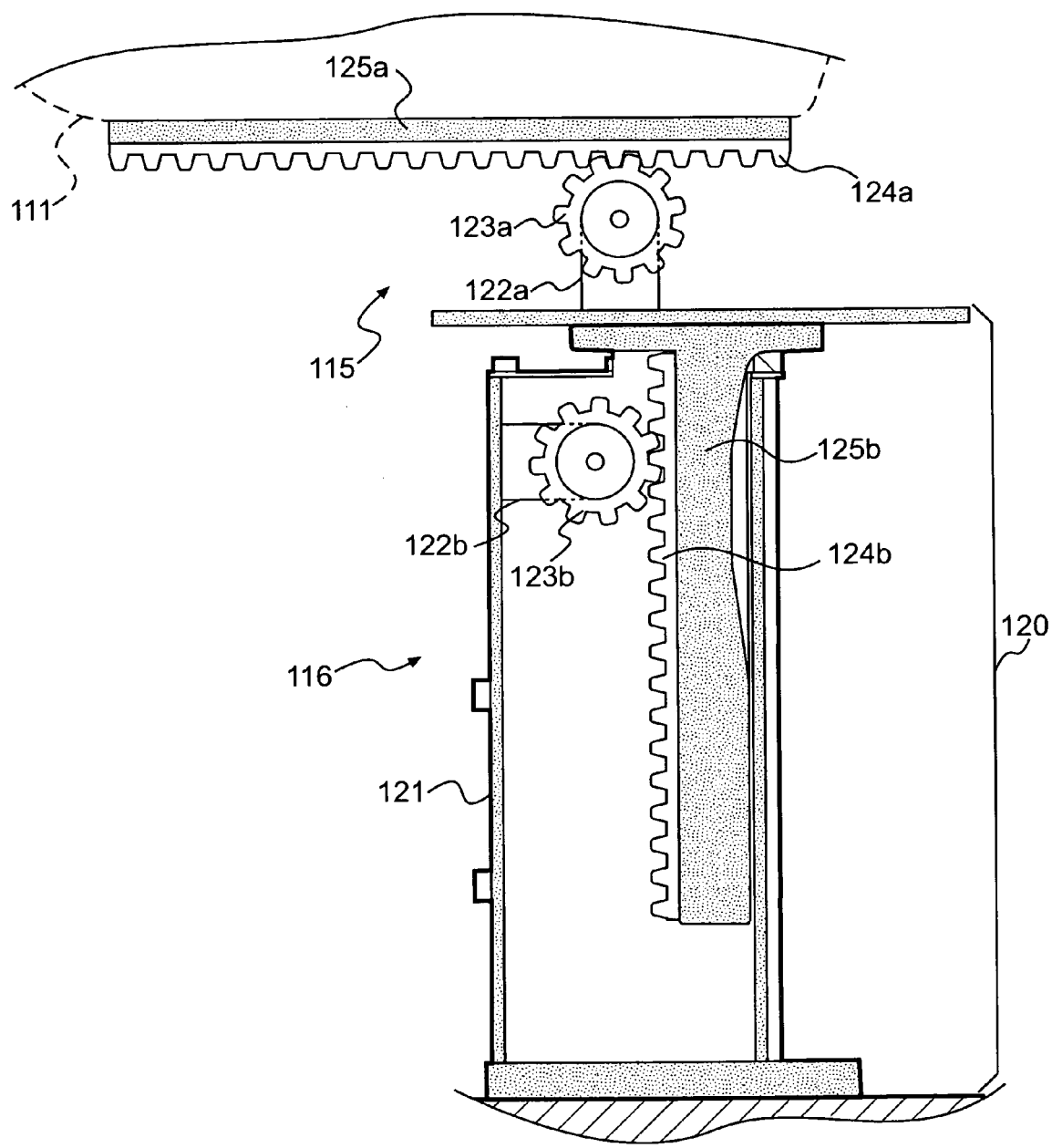
FIG. 4A illustrates a cross-sectional side view of an electrically adjustable control interface depicting adjustment module 113 embodied as a rack-and-pinion drive system in a fully retracted position, consistent with the disclosed embodiments.
Figure 4B:
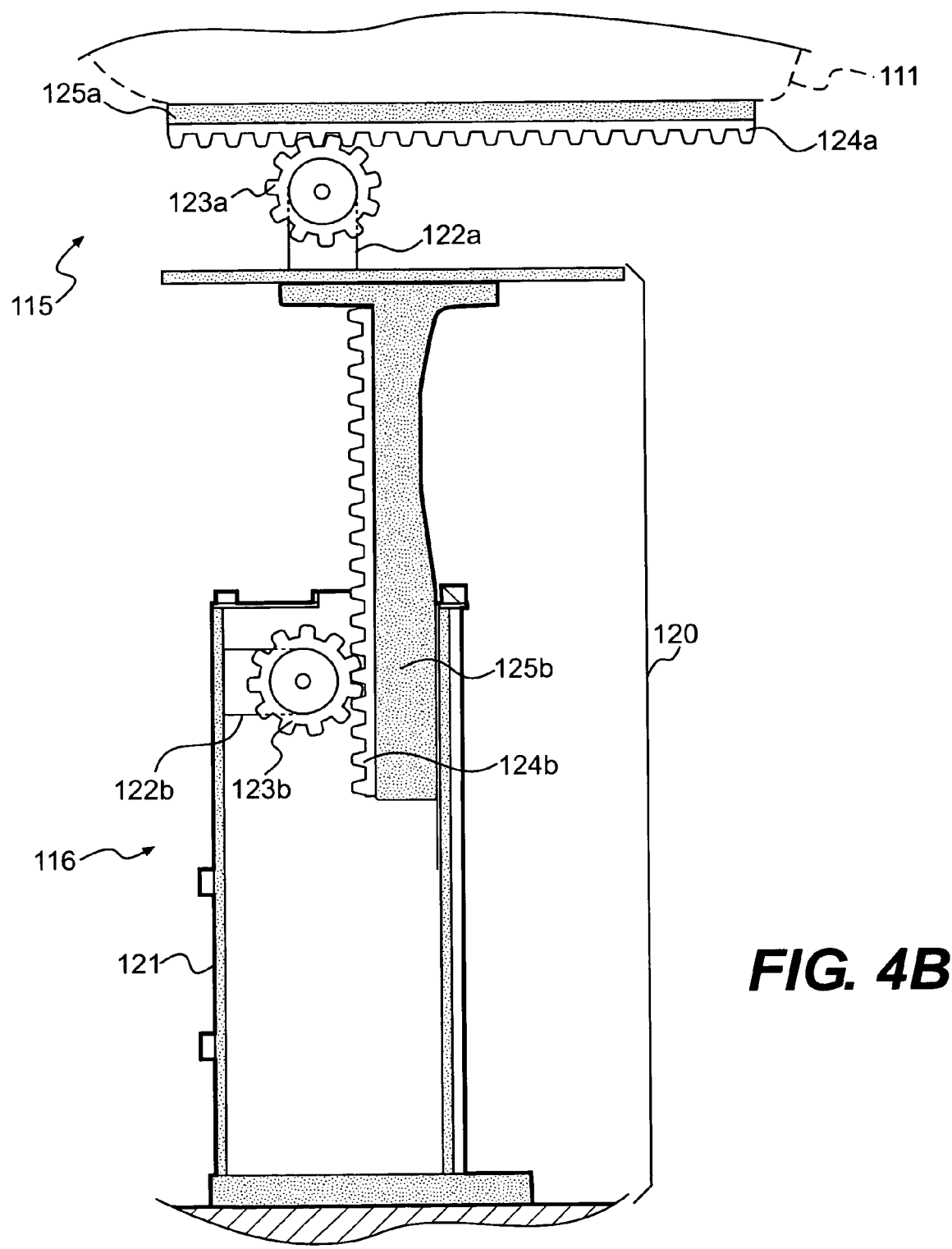
FIG. 4B illustrates a cross-sectional side view of the electrically adjustable control interface depicting adjustment module 113 embodied as a rack-and-pinion drive system in an extended position, consistent with the disclosed embodiments.

FIGS. 3A, 3B, 4A, and 4B provide detailed cross sectional views of an exemplary embodiment of adjustment module 113. FIG. 3A illustrates a cross-sectional view depicting adjustment module 113 embodied as a screw-type, worm gear drive system and in a fully retracted position. FIG. 3B illustrates a cross-sectional view depicting the adjustment module 113 of FIG. 3A, in a fully extended position. FIG. 4A illustrates a cross-sectional view depicting adjustment module 113 embodied as rack-and-pinion drive system and in a fully retracted position. FIG. 4B illustrates a cross-sectional view depicting the adjustment module 113 of FIG. 4A, in a fully extended position. As illustrated in each of FIGS. 3A, 3B, 4A, and 4B adjustment module 113 may include a horizontal adjustment assembly 115, a vertical adjustment assembly 116 coupled to horizontal adjustment assembly 116, and a mounting interface 117 disposed on horizontal adjustment assembly 115 for mounting of control pod module thereto.

Adjustment module 113 is configured for mounting within the cab of machine 100. According to an exemplary embodiment, adjustment module 113 may be secured to the floor of an cab of machine 100. According to another embodiment, adjustment module 113 may be mounted to an operator console (e.g., chair, command center, etc.) within the cab of machine, such that a movement or adjustment in the operator console includes corresponding movement in adjustment module 113.

In accordance with one exemplary embodiment, adjustment module 113 may embody a telescoping pedestal-type skeletal frame, with horizontal adjustment assembly 115 and vertical adjustment assembly 116 disposed within the skeletal frame. As such, as horizontal adjustment assembly 115 and vertical adjustment assembly 116 are adjusted/positioned, the telescoping skeletal frame may correspondingly be extended and retracted. Consequently, in the fully retracted position, a first portion of the telescoping pedestal-type skeletal frame may be configured to nest within a second portion of telescoping pedestal-type skeletal frame, thereby limiting the footprint of adjustment assembly when in the fully retracted position (as illustrated in FIG. 3A).

Horizontal adjustment assembly 115 and vertical adjustment assembly 116 may include electric motors 122a, 122b, respectively, coupled to respective rotating members 123a, 123b, each rotating member 123a, 123b being operatively coupled to respective stationary members 124a, 124b, each of which is coupled to a support member 125a, 125b. Horizontal adjustment assembly 115 and vertical adjustment assembly 116 may each be communicatively coupled to controller 112 and configured to operate one or more of electric motors 122a, 122b in response to control signals received from controller 112.

Although adjustment module 113 is illustrated as having horizontal and vertical adjustment assemblies 115, 116, it is contemplated that adjustment module 113 may include additional adjustment assemblies. For example, adjustment module 113 may include a second horizontal adjustment assembly (not shown), which may enable lateral (left/right) adjustment of electrically adjustable control interface 110. Alternatively or additionally, adjustment module 113 may include a rotational adjustment assembly (not shown) that enables rotation of electrically adjustable control interface 110 in response to corresponding control signals received from controller 112. It is further contemplated that, as with horizontal and vertical adjustment assemblies 115, 116, any additional adjustment assemblies may be adapted to include appropriate hardware (e.g., motor 122, rotating member 123, stationary member 124, etc.) that may be required to support independent control of such additional adjustment assemblies.

Electric motors 122a, 122b may include any suitable electric drive device that can fit within telescoping pedestal-type skeletal frame of adjustment module 113. According to one embodiment, electric motors 122a, 122b may be a brushed (commutator-type) or brushless (switch-type) DC motor, configured to rotate a rotor relative to a stator. The rotor may be coupled to a shaft, which may be coupled to rotating members 123a, 123b, so that rotating members 123a, 123b rotate in response to an operation of respective electric motors 122a, 122b.

Rotating members 123a, 123b may each be coupled to an output shaft of respective electric motors 122a, 122b and may be configured to rotate about an axis defined by the shaft. According to one embodiment and as illustrated in FIGS. 3A and 3B, rotating members 123a, 123b may include a threaded, screw-type shaft, with threads disposed about the cylindrical surface of the shaft. According to another embodiment, and as illustrated in FIGS. 4A and 4B, rotating members 123a, 123b may each include a circular cog-type pinion device, with teeth disposed radially about the surface of the device.

Stationary members 124a, 124b may be interactively coupled with rotating members 123a, 123b, respectively, and may be configured move relative to respective rotating members 123a, 123b as rotating members 123a, 123b turn. When rotating members 123a, 123b are implemented as a threaded, screw-type shaft (as in FIGS. 3A and 3B), stationary members 124a, 124b may embody nut-type elements having internal threads corresponding to the threads on the screw-type shaft. Consequently, as the screw type shaft is rotated by electric motors 122a, 122b, stationary members 124a, 123b may be longitudinally advanced, by a "screwing" motion, along respective rotating members 123a, 123b.

When rotating members 123a, 123b are embodied as a cog-type pinion devices (as in FIGS. 4A and 4B), stationary members 124a, 124b may each embody a linear rack element with teeth spaced such that spaces between adjacent teeth of the linear rack element receive teeth of the cog-type pinion device. Accordingly, rotation of the cog-type pinion device forces the linear rack assembly to advance in the direction of rotation of cog-type pinion device.

Support members 125a, 125b may each be coupled to respective stationary members 124a, 124b, such that movement of stationary members 124a, 124b includes a corresponding movement of support members 125a, 125b. Support members 125a, 125b may each be configured to provide horizontal and/or vertical support for one or more of vertical adjustment assembly 116 and/or control pod module 111. According to one exemplary embodiment, and as illustrated in FIGS. 3A, 3B, 4A and 4B, control pod module 111 is mounted upon support member 125a associated with horizontal adjustment assembly 115. Horizontal adjustment assembly 115 is then mounted upon support member 125b associated with vertical adjustment assembly 116.

Figure 5:
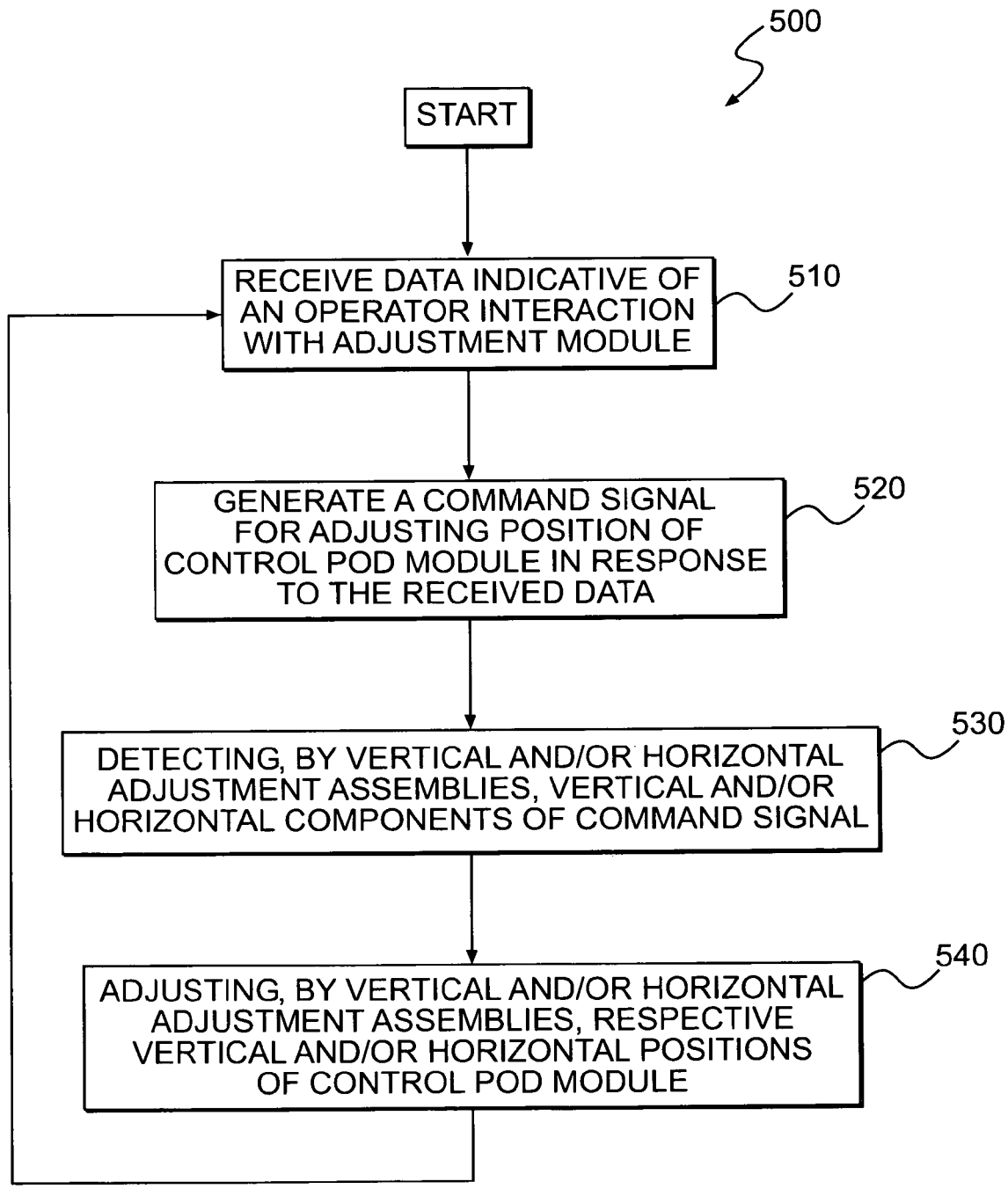
FIG. 5 provides a flowchart depicting an exemplary method for adjusting the position of electrically adjustable control interface 110, consistent with the disclosed embodiments.

Processes and methods consistent with the disclosed embodiments may enable components and systems associated with electrically adjustable control interface 110 to customize and adjust the position of electrically adjustable control interface 110, based on operator-supplied control signals received from adjustment interface 120. Specifically, controller 112 may be configured to receive control signals from adjustment interface 120 and generate command signals for adjusting the position of electrically adjustable control interface 110 based on the control signals from adjustment interface 120. FIG. 5 provides a flowchart 500 depicting a method for adjusting the position of electrically adjustable control interface 110 consistent with the disclosed embodiments.

As illustrated in FIG. 5, the method may commence upon receipt of data indicative of an operator interaction with adjustment module 120 (Step 510). Specifically, when an operator interacts with adjustment module 120 to, for example, adjust the position of electrically adjustable control interface 110, adjustment module 120 may generate signals indicative of the operator interaction. Controller 112, which is communicatively coupled to adjustment module 120, may receive these signals from adjustment module 120.

In some situations, data indicative of an operator interaction with adjustment module 120 may include data corresponding to specific operator adjustment instructions. That is, data indicative of an operator interaction may include operator interactions with a directional joystick associated with adjustment module 120, which may be indicative of an operator command to vertically, horizontally, and/or rotationally adjust a position of electrically adjustable control interface 110. For example, a forward/backward interaction with a directional joystick associated with adjustment module 120 may be associated with an operator command to horizontally adjust the position of electrically adjustable control interface 110 (i.e., to move the electrically adjustable control interface 110 forward and backward.) Alternatively, a side-to-side interaction with a directional joystick associated with adjustment module 120 may correspond with an operator command to vertically adjust the position of electrically adjustable control interface 110 (i.e., to raise/lower the electrically adjustable control interface 110). In yet another alternative, a rotational interaction (i.e., "grab-and-turn" interaction) with a directional joystick associated with adjustment module 120 may correspond with an operator command to rotate electrically adjustable control interface 110 about a predefined axis of rotation.

As an alternative or in addition to specific operator instructions, data indicative of an operator interaction may include generalized operational instructions. Generalized operational instructions may include operator interaction with "hotkey" buttons associated with adjustment module 120. Such generalized operational instructions may include commands for automatically adjusting the position of electrically adjustable control interface 110 to a default position. For example, an operator may generate, through interaction with a first "hotkey" button associated with adjustment module 120, a command for moving the electrically adjustable control interface 110 to a "home" (e.g., fully retracted) position. Alternatively or additionally, an operator may generate, through execution of a second "hotkey" button associated with adjustment module 120, a command for retrieving customized position settings previously stored by the operator.

It is contemplated that commands for retrieving certain customized operator settings may be executed without direct operator interaction with adjustment module 120. For example, controller 112 may be configured to detect an identification code provided by the operator, the identification code adapted to identify the operator and retrieve any customized equipment settings associated with the operator. The identification code may be provided by the operator of the machine by, for example, operator entry of an operator-specific password at an interactive display console (not shown) associated with machine 100.

Alternatively, controller 112 may be configured to automatically detect an identification code associated with the operator. For example, controller 112 may be configured to broadcast an RFID detection signal to detect RFID devices in an area surrounding controller such as, for example, RFID devices that may be located in an operator ID badge or cell phone. Controller 112 may receive an RFID feedback signal if any RFID devices are detected in response to the RFID detection signal. Controller 112 may be communicatively coupled to an operator database and may automatically locate and retrieve customized operator settings from the operator, upon receipt of an RFID feedback signal.

Upon receiving data indicative of an operator interaction with adjustment module 120, controller 112 may generate a command signal for adjusting the position of the electrically adjustable control interface 110 in response to the received data (Step 520). For example, controller 112 may process the data indicative of an operator interaction with adjustment module 120 and generate one or more command signals for operating one or more of electric motors 122a, 122b. According to one exemplary embodiment, controller 112 may be configured to detect horizontal and vertical components of the data indicative of an operator interaction with adjustment module 120 and provide distinct control signals for separately operating respective electric motors 122a, 122b.

Horizontal adjustment assembly 115 and vertical adjustment assembly 116 may each detect command signals for adjusting the position of electrically adjustable control interface 110 from controller 112 (Step 530). According to one exemplary embodiment, electric motors 122a, 122b associated with horizontal and vertical adjustment assemblies 115, 116 may each be communicatively coupled to controller 112 and configured to receive position adjustment command signals from controller 112. Electric motors 122a, 122b may each be configured to operate in response to respective horizontal and vertical components of the received command signals (Step 540), thereby adjusting the position of respective horizontal and vertical adjustment assemblies 115, 116 in response to the operator command signals.

It is contemplated that additional, fewer, and/or different steps may be implemented as part of the method for adjusting the position of electrically adjustable control interface 110 discussed and illustrated above. For example, the method may include a step for recording, in response to an operator command, customized preferences associated with the electrically adjustable control interface 110 such as, for example, a current horizontal and/or vertical position of the electrically adjustable control interface 110. Alternatively or additionally, the method may include a separate step for retrieving customized preferences from memory associated with controller 112 and automatically adjusting electrically adjustable control interface 110 according to the customized preferences. Thus, the method for adjusting the position of electrically adjustable control interface 110 discussed and illustrated above is exemplary only and not intended to be limiting.

Industrial Applicability

The electrically adjustable control interface consistent with embodiments disclosed and described herein enables equipment operators to adjust the position of console controls using electrically-assisted drive components, without having to rely on manually-adjustable mechanisms that tend to wear and can be cumbersome to operate. Furthermore, the presently disclosed electrically adjustable control interface includes components for separately adjusting the horizontal and vertical positions of the control interface. Accordingly, the presently disclosed electrically adjustable control interface may be applicable to any machine where it may be advantageous to provide power-assisted console position adjustment capabilities and/or enable independent adjustment of horizontal and vertical positions of a console position. Although certain disclosed embodiments are described and illustrated as being associated with a motor grader, they may be applicable to any machine where it may be advantageous to implement an adjustable control interface.

The presently disclosed electrically adjustable control interface may have several advantages. Specifically, electrically adjustable control interface 110 may provide the operator with increased flexibility associated with controlling the position of the operator console. For example, electrically adjustable control interface 110 includes separate horizontal and vertical adjustment assemblies 115, 116, which include separate drive mechanisms that may be independently operated by controller 112. By providing separate, independently-controllable drive assemblies, the horizontal and vertical positions of electrically adjustable control interface 110 may be adjusted without requiring a corresponding adjustment in the other. As a result, the presently disclosed electrically adjustable control interface possesses increased flexibility when compared with conventional console adjustment solutions having a common horizontal and vertical drive system that require simultaneous adjustment of horizontal and vertical positions.

Furthermore, the electrically adjustable control interface described herein provides power-assisted positioning of the control interface, reducing the need for mechanical adjustment components that are prone to wear more quickly than electrical components. Furthermore, by using electric drive assemblies for positioning the control interface, which can be controlled with greater precision than manual adjustment assemblies, the presently disclosed system may provide operators with more flexibility to customize the position of electrically adjustable control interface 110 to fit their precise ergonomic specifications.

What is claimed is:

1. An electrically adjustable control interface for a machine, comprising
   a control pod module including a controller and an adjustment interface each disposed thereon, the controller configured to control movement of the machine or movement of an implement connected to the machine; and
   an adjustment module connected to the control pod module, the adjustment module comprising:
      a vertical adjustment assembly comprising a telescoping arm at least partially disposed within a vertically-mounted housing and arranged in vertical support of the control pod module and configured to adjust a vertical position of the control pod module in response to a vertical adjustment command signal generated by the adjustment interface that is disposed on the control pod module; and
      a horizontal adjustment assembly comprising a telescoping arm at least partially disposed within a horizontally-mounted housing, wherein the horizontal adjustment assembly is directly coupled to the control pod module and configured to adjust a horizontal position of the control pod module in response to a horizontal adjustment command signal generated by the adjustment interface that is disposed on the control pod module.

2. The electrically adjustable control interface of claim 1, wherein the vertical or the horizontal adjustment assembly includes at least a portion of a rack and pinion mechanism for adjusting the vertical or the horizontal position of the control pod module.

3. The electrically adjustable control interface of claim 1, wherein the vertical or the horizontal adjustment assembly includes at least a portion of a screw-type mechanism for adjusting the vertical or the horizontal position of the control pod module.

4. The electrically adjustable control interface of claim 1, wherein the control pod module includes an arm-rest assembly.

5. The electrically adjustable control interface of claim 1, wherein the adjustment module is configured to:
   receive at least one of a vertical adjustment input and a horizontal adjustment input from an operator of the machine through the adjustment interface; and
   provide the at least one of the vertical adjustment input and the horizontal adjustment input to the vertical or the horizontal adjustment assembly.

6. The electrically adjustable control interface of claim 1, wherein the controller includes a joystick configured to receive an operator input for controlling the movement of the machine or movement of an implement connected to the machine.

7. A method for adjusting a control interface for a machine, comprising:
   generating a control signal for adjusting a position of a control pod module that includes a joystick and an adjustment interface, the joystick being configured to control movement of the machine or movement of an implement connected to the machine, and the control signal being generated by the adjustment interface;
   detecting, by a vertical adjustment assembly of an adjustment module that is connected to the control pod module, a vertical adjustment command signal generated by the adjustment interface;
   adjusting, by the vertical adjustment assembly, a vertical position of the control pod module;
   detecting, by a horizontal adjustment assembly of the adjustment module, a horizontal adjustment command signal generated by the adjustment interface, wherein the horizontal adjustment assembly is directly coupled to the control pod module;
   adjusting, by the horizontal adjustment assembly, a horizontal position of the control pod module;
   detecting, by a rotational adjustment assembly of the adjustment module, a rotational adjustment command signal generated by the adjustment interface; and
   rotating, by the rotational adjustment assembly, the control pod module in response to the rotational adjustment command signal.

8. The method of claim 7, wherein generating the control signal includes:
   identifying a machine operator with the adjustment interface;
   retrieving a stored default position of the control pod module associated with the identified machine operator; and
   automatically generating the control signal based on the stored default position.

9. An operator console for a machine, comprising:
   a control pod module;
   a controller electrically coupled to and disposed on the control pod module, the controller configured to control movement of the machine or movement of an implement connected to the machine;
   an adjustment interface electrically coupled to and disposed on the control pod module, the adjustment interface configured to detect an operator interaction and generate a control signal for adjusting a position of the control pod module based on the operator interaction, the control signal including a least one of a vertical adjustment command signal and a horizontal adjustment command signal; and
   an adjustment module mechanically coupled to the control pod module and electrically coupled to the adjustment interface, the adjustment module including:
      a vertical adjustment assembly comprising a telescoping arm at least partially disposed within a vertically-mounted housing and arranged in vertical support of the control pod module and configured to adjust a vertical position of the control pod module in response to the vertical adjustment command signal generated by the adjustment interface that is disposed on the control pod module; and a horizontal adjustment assembly comprising a telescoping arm at least partially disposed within a horizontally-mounted housing, wherein the horizontal adjustment assembly is directly coupled to the control pod module and configured to adjust a horizontal position of the control pod module in response to the horizontal adjustment command signal generated by the adjustment interface that is disposed on the control pod module; and a rotational adjustment assembly configured to rotate the control pod module relative to a vertical axis in response to a rotational command signal generated by the adjustment interface that is disposed on the control pod module.

10. The operator console of claim 9, wherein the control signal includes a default position command for positioning the control pod module in a default position.

11. The operator console of claim 10, wherein the default position includes a fully retracted position of one or more of the vertical adjustment assembly and the horizontal adjustment assembly.

12. The operator console of claim 10, wherein a memory device electrically connected to the adjustment interface is configured to store at least one of a current vertical position or a current horizontal position of the control pod module as the default position.

13. The operator console of claim 12, wherein the memory device is further configured to associate the default position with one or more particular machine operators.

14. The operator console of claim 13, wherein the controller is further configured to:
identify a machine operator through the adjustment interface;
retrieve the stored default position of the control pod module associated with the identified machine operator; and
automatically generate at least one of the vertical adjustment command signal and the horizontal adjustment command signal based the retrieved default position.

15. The operator console of claim 9, wherein the control pod module includes an arm-rest assembly.

16. The electrically adjustable control interface of claim 1, wherein the adjustment interface is disposed adjacent the controller on the control pod module.

17. The electrically adjustable control interface of claim 16, wherein the adjustment interface includes a combination switch.

18. The electrically adjustable control interface of claim 16, wherein the adjustment interface includes a joystick.

19. The electrically adjustable control interface of claim 16, wherein the adjustment interface includes a joystick providing direction or rotational control.

* * * * *